United States Patent [19]

Wu

[11] Patent Number: 5,619,302

[45] Date of Patent: Apr. 8, 1997

[54] APPARATUS AND METHOD FOR SCANNING A BOUND DOCUMENT USING A WEDGE SHAPED PLATEN

[75] Inventor: Xiaodong Wu, Atherton, Calif.

[73] Assignee: Xerox Corporation, Stamford, Conn.

[21] Appl. No.: 635,095

[22] Filed: Apr. 17, 1996

[51] Int. Cl.$^6$ .......................... G03B 27/32; G03B 27/62; G03G 21/00; H04N 1/46

[52] U.S. Cl. ..................... 355/25; 355/75; 358/512; 399/204; 399/221

[58] Field of Search ................................. 355/24, 25, 75, 355/82, 230, 229; 358/511, 512

[56] References Cited

U.S. PATENT DOCUMENTS

| | | | |
|---|---|---|---|
| 3,888,584 | 6/1975 | Smith | 355/75 |
| 4,068,950 | 1/1978 | Kito | 355/75 |
| 4,204,730 | 5/1980 | Miyashita et al. | 355/25 |
| 4,585,334 | 4/1986 | Malyon | 355/25 |
| 4,645,332 | 2/1987 | Malyon | 355/25 |
| 4,663,873 | 5/1987 | Shinbrot | 40/531 |
| 4,688,930 | 8/1987 | Ohno | 355/25 |
| 4,980,720 | 12/1990 | Siegel | 355/233 |
| 5,119,206 | 6/1992 | Rourke et al. | 358/296 |
| 5,212,568 | 5/1993 | Graves et al. | 358/474 |
| 5,276,530 | 1/1994 | Siegel | 358/406 |
| 5,359,207 | 10/1994 | Turner | 257/81 |
| 5,390,033 | 2/1995 | Bannai et al. | 358/498 |
| 5,471,277 | 11/1995 | Fujioka et al. | 355/25 |
| 5,475,505 | 12/1995 | Minasian et al. | 358/474 |

FOREIGN PATENT DOCUMENTS

| | | | |
|---|---|---|---|
| 3546404A1 | 7/1993 | Germany | G02B 27/02 |
| 59-0890782 | 5/1984 | Japan | H04N 1/10 |
| 2158599 | 2/1985 | United Kingdom | G03B 27/50 |

OTHER PUBLICATIONS

Agarwal, V.K., "Book Copying Apparatus," Xerox Disclosure Journal, vol. 9, No. 6, Nov./Dec., 1984, p. 383.

Guenther, J., "Library Copier," Xerox Disclosure Journal, vol. 12, No. 5, Sep./Oct., 1987, pp. 231–232.

U.S. Patent Application No. 08/570,880 entitled "Bound Document Imager with Page Turner" to Turner et al., filed on Dec. 12, 1995.

U.S. Patent Application No. 08/570,791 entitled "Bound Document Imager with Air Jet Page Turning System" to Turner et al., filed on Dec. 12, 1995.

Primary Examiner—Arthur T. Grimley
Assistant Examiner—David A. Lane

[57] ABSTRACT

A wedge shaped platen scanner sequentially records opposing pages of a bound document positioned thereon. A dichroic mirror is positioned between the surfaces of the wedge shaped platen. The two sides of the opposing pages of the bound document are exposed by light having different wavelengths. One side is exposed by a flash lamp that emits light with a wavelength that forms an optical path through the dichroic mirror and onto an imaging station. The other side is exposed by a flash lamp emits light with a wavelength that forms a reflective path off of the dichroic mirror and onto the imaging station. A controller insures that the opposing pages of the bound document are sequentially illuminated by the two flash lamps. Images of opposing pages of the bound document are focused through optics onto the imaging station. In one arrangement, the imaging station is a two-dimensional array of detectors which sense an image of a page of the bound document projected thereon. In another arrangement, the imaging station is a photoconductive belt which when exposed by either flash lamp records a latent image thereon. In either arrangement, a one page imaging station records opposing pages of a bound document either electronically or on print media, one page at a time.

25 Claims, 5 Drawing Sheets

APPARATUS AND METHOD FOR SCANNING A BOUND DOCUMENT USING A WEDGE SHAPED PLATEN

Cross reference is made to the co-pending U.S. patent applications Ser. Nos. 08/635,100, and 08/635,438 filed concurrently herewith, and entitled "Apparatus And Method For Scanning A Bound Color Document Using A Wedge Shaped Platen", and "Apparatus And Method For Scanning A Bound Document Using A Wedge Shaped Platen With A Moving Mirror", (Attorney Docket Nos. D/96126 and D/96127), respectively.

The present invention relates generally to a system for scanning a bound document, and more particularly to a method and apparatus for sequentially scanning opposing pages of the bound document with an imager having an image sensing area sufficient to capture one opposing page of the bound document at a time.

BACKGROUND OF THE INVENTION

With the advent of inexpensive digital storage, recording bound documents in a digital format is an important way of preserving information in books, periodicals, manuscripts, or any other document having a bound edge with a hard or soft cover. Content of a page of a bound document is first scanned and then electronically recorded. The recorded digital image can then be manipulated or processed to enhanced forms not originally available in its bound format. For example, digital images recorded on a storage medium can be reproduced audibly using applications that generate speech from ASCII text. Alternatively, bound documents digitally recorded can be reformatted or enhanced with additional information and reproduced on demand as hardcopy using an electronic printing machine such as a laser or ink jet printer.

In order to minimize the stress on the spine of bound documents when capturing or copying image content, wedge or angled platens of scanners and copying machines have been developed. For example. U.S. Pat. No. 3,888,584 to Smith, U.S. Pat. No. 4,068,950 to Kito, and "Book Copying Apparatus," by V. Agarawal, Xerox Disclosure Journal Vol. 9, No. 6, November/December, 1984, p. 383, disclose arrangements for scanning a book on a platen supported horizontally with respect to a support surface. Specifically, an edge of the support surface is arranged to meet a side wall in order that a bound document can be draped over the side of the scanner. While some arrangements provide support for a bound document with a wedge platen having an angle of approximately ninety degrees, other arrangements provide support with wedge platens having angles less than or greater than ninety degrees. For example, Guenther discloses a wedge platen having an angle greater than ninety degrees in "Library Copier," Xerox Disclosure Journal Vol. 12, No. 5, September/October, 1987, pp. 231–232. Alternatively, UK Patent Application GB 2 158 599A, published 1985 to Kobayashi, discloses an electrophotocopier with a wedge platen that is less than ninety degrees.

A principal function of wedge or angled scanning surfaces is to prevent damage to a bound document by minimizing stress applied to its binding as it is held open for scanning in a position as close to the platen of a scanner as possible. Typically when using a flatbed scanner, a force has to be applied the spine region of a bound document to insure that the document is within the scanner's depth of focus. A wedge or angled platen, however, positions the spine region of a bound document within the scanner's depth of focus without requiring the application of additional force to the document's binding. U.S. Pat. Nos. 4,980,720 and 5,276,530 to Siegel disclose a book scan mode for a flat-bed scanner which minimizes the force typically required to be applied to a binding. In the book scan mode, a page height detector mounted on a scan carriage accounts for the deviation of the book pages from the horizontal platen plane. Alternatively, U.S. Pat. No. 5,475,505 to Minasian et al. discloses a combination flat-bed scanner and wedge shaped scanner. Specifically, Minasian et al. discloses a canted platen input scanner with an adjustable housing support. In a first position, the housing support is canted to facilitate scanning of bound documents, and in a second position the housing support brings the platen to a horizontal position to facilitate scanning other classes of documents.

Additional examples of wedge platens for scanning bound documents include, U.S. Pat. No. 5,359,207 to Turner, German Patent DE-A1 3546404, and U.S. Pat. Nos. 4,585,334 and 4,645,332 to Malyon. Turner discloses a book scanner with contact imaging that employs two-dimensional sensor arrays that are attached at a common edge and disposed in a wedge shaped manner. German Patent DE-A1 3546404 discloses a root-shaped book support apparatus for use in a copier application. The optics of the roof-shaped copier arrangement provide that opposing pages of a bound book are simultaneously imaged in the same image plane. Consequently, the roof-shaped book support apparatus must have an image sensing area large enough to capture two pages of a bound document at a time. In addition, the roof-shaped copier arrangement adjusts the spacing of the images of both pages in the image plane without having to change the position of the book. Malyon discloses a photocopying device with a V-shaped book rest for supporting and scanning a book in an open condition.

In order to facilitate the copying or reproduction of bound documents a plurality of automatic page turning apparatuses have been developed. Such page turning apparatuses minimize the amount of manual effort required to electronically capture the contents of a bound document. By way of example, U.S. Pat. No. 4,663,873 to Shinbrot, U.S. Pat. No. 5,390,033 to Bannai et al., and U.S. Pat. No. 5,471,277 to Fujioka et al. disclose arrangements for turning pages of a book within a copier. Other page turning arrangements include U.S. patent application Ser. No. 08/570,880 entitled "Bound Document Imager with Page Turner" to Turner et al., filed on Dec. 12, 1995 and assigned to the same assignee as the present invention, and U.S. patent application Ser. No. 08/570,791 entitled "Bound Document Imager with Air Jet Page Turning System" to Turner et al., filed on Dec. 12, 1995 and assigned to the same assignee as the present invention.

Further advances have been made to electronic publishing systems to offer job programing of books on a flat bed scanning system. U.S. Pat. No. 5,119,206 to Rourke et al. discloses a system for printing bound documents. The system can be programmed to scan either a selected side or both sides of the bound document. The attached printing system can then be programmed to print both sides of a page on a common print media sheet or on separate print media sheets. U.S. Pat. No. 5,212,568 to Graves et al. discloses an electronic reprographic apparatus that selectively controls the areas of the document to be imaged. The system enables the user to identify the type of input document so that the potential of imaging beyond document edges or in bound document gutter regions is eliminate.

All references cited above are incorporated herein by reference where appropriate for appropriate teachings of additional or alternative details, features, and/or technical background.

Although the aforementioned wedge scanning systems reduce stress applied to bound edges of documents, most wedge scanning systems scan a single page of a bound document at a time and require that the bound document is repositioned before the opposing page is scanned since only one face of the wedge scanning system is used to record image data. In contrast, other scanning systems such as that disclosed in German Patent DE-A1 3546404 do not require repositioning a bound document in order to image both sides. However, such a scanning system requires an image sensing area sufficiently large to simultaneously capture both pages of the bound document. Similarly, the aforementioned wedge contact scanning system disclosed by Turner requires two two-dimensional flat panel detectors to image opposing pages of a bound document without having to repositioning it in order to scan both sides. In addition, such contact imaging arrangements have a reduced depth of focus since it is difficult to provide contact sensors with thin yet durable surface protection. Accordingly, it would be desirable to provide a wedge scanning system with an increased depth of focus. In addition, it would be desirable to provide a wedge scanning system that does not require repositioning a bound document while sequentially imaging opposing sides of the bound document using a sensing area that captures a single opposing page of a bound document at a time.

SUMMARY OF THE INVENTION

In accordance with one aspect of the invention, there is provided an apparatus for scanning a bound document having a first opposing page and a second opposing page. A wedge shaped platen has a first transparent surface and a second transparent surface for supporting the bound document in an open condition with the first and the second opposing pages being adjacent the first and the second transparent surfaces. A light source illuminates the first transparent surface of the wedge shaped platen with light having a first wavelength, and illuminates the second transparent surface of the wedge shaped platen with light having a second wavelength. An imager sequentially captures light reflected thereon from the first and the second transparent surfaces of the wedge shaped platen. An optical element is positioned in a first optical path extending between the first transparent surface and the imager, and is positioned in a second optical path extending between the second transparent surface and the imager. The optical element transmits light in the first optical path having the first wavelength and reflects light in the second optical path having the second wavelength.

In accordance with another aspect of the invention, there is provided a method for scanning a bound document supported on a wedge shaped platen having a first transparent surface and a second transparent surface. The method includes the steps of: positioning an imager to receive images projected from the first and the second transparent surfaces; positioning an optical element in a first optical path extending between the first transparent surface and the imager, and in a second optical path extending between the second transparent surface and the imager; illuminating a first opposing page of the bound document positioned on the first transparent surface of the wedge shaped platen with light having a first wavelength; capturing with the imager a representation of the first opposing page illuminated along the first optical path: illuminating a second opposing page of the bound document positioned on the second transparent surface of the wedge shaped platen with light having a second wavelength; and capturing with the imager a representation of the second opposing page illuminated along the second optical path.

BRIEF DESCRIPTION OF THE DRAWINGS

These and other aspects of the invention will become apparent from the following description which illustrates a preferred embodiment of the invention read in conjunction with the accompanying drawings wherein the same reference numerals have been applied to like parts and in which.

DETAILED DESCRIPTION

Figure 1:
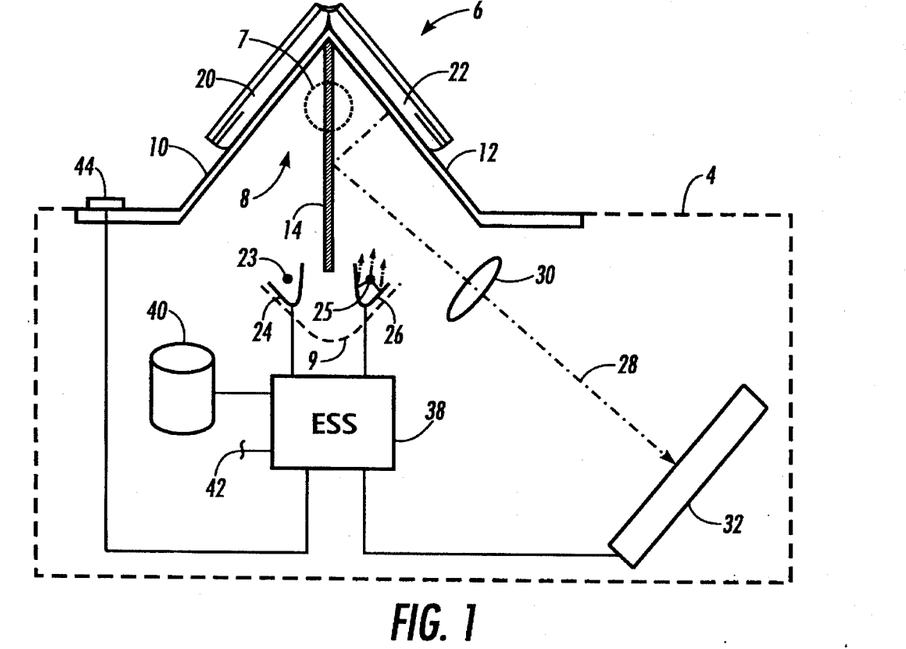
FIG. 1 illustrates a scanning system incorporating the present invention showing a first opposing page of a bound document supported on a wedge shaped platen being recorded by an imager.
Figure 2:
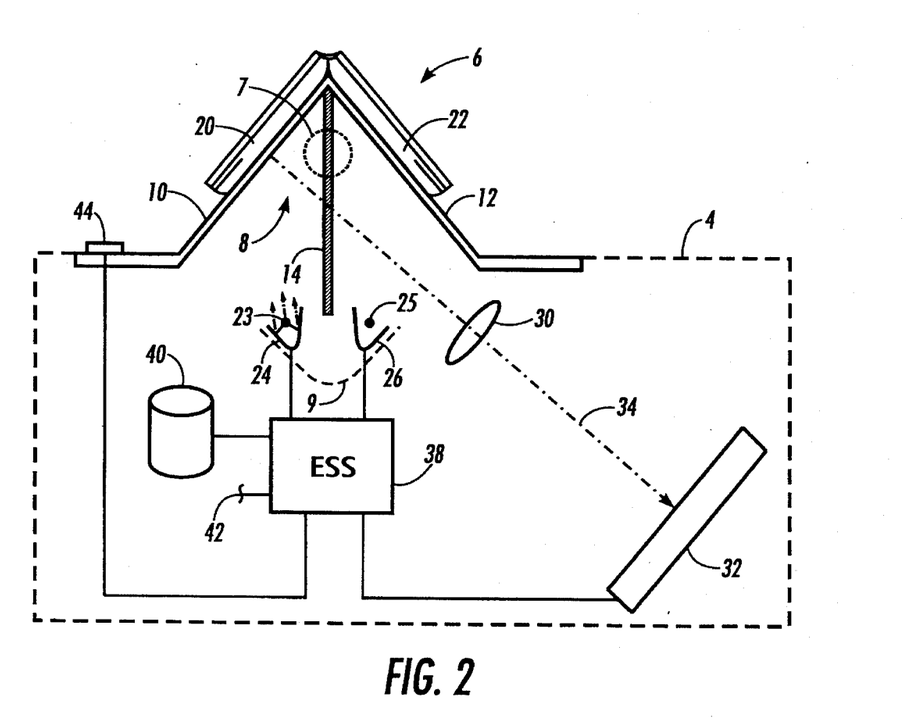
FIG. 2 is the scanning system shown in FIG. 1 showing a second opposing page of a bound document supported on a wedge shaped platen being recorded by the imager.

Referring now to the drawings where the showings are for the purpose of describing the preferred embodiment of the invention and not for limiting same, FIGS. 1 and 2 show a scanning system 4 incorporating the present invention. Scanning system 4 includes a wedge shaped platen 8 adapted for scanning a bound document 6. Bound document 6 is defined herein as any document having a bound edge such as a book or a periodical. The wedge shaped platen 8 includes a first face 10 and a second face 12 for holding bound input documents in an open position for scanning. Faces 10 and 12 of platen 8 are transparent and can be formed, for example, with any clear glass or plastic. The angled shape of the wedge shaped platen 8 advantageously minimizes stress to the spine region of bound documents when scanning. Unlike flat bed scanners, an angled platen does not require additional pressure to the spine region of a bound document in order for scanned pages to be within the depth of focus of scanning system 4.

Figure 3:
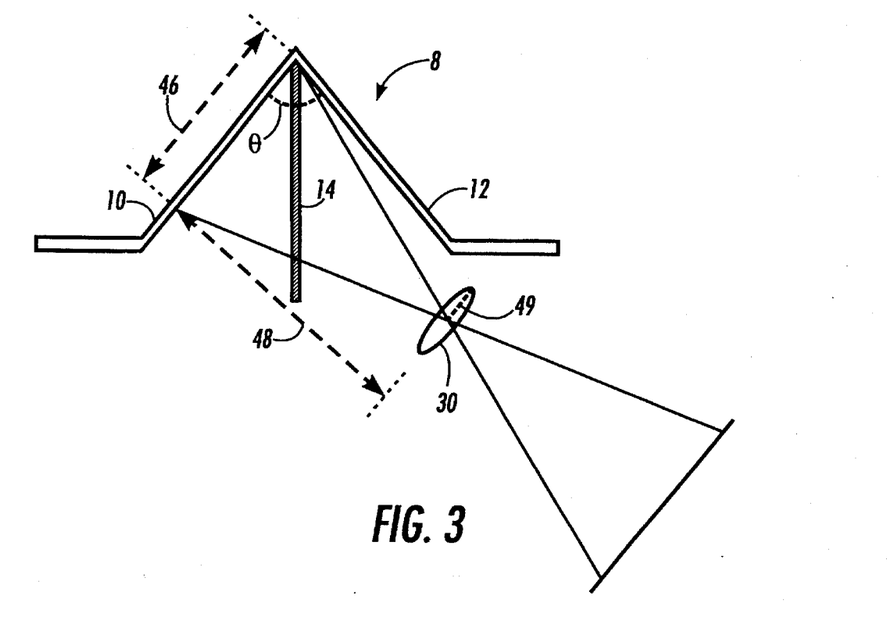
FIG. 3 illustrates physical constraints of one embodiment of the scanning system shown in FIGS. 1 and 2.

With reference now to FIG. 3, constraints of the angle of wedge shaped platen 8 of the scanning system 4 are shown in detail. Generally, angle θ between face 10 and face 12 of wedge platen 8 is defined to be less than ninety degrees in order that a bound document being imaged on wedge shaped platen 8 is open as little as possible. It will, however, be understood by those skilled in the art that wedge platen 8 can operate with an angle θ that is greater than or equal to ninety degrees. By minimizing the extent to which a bound document is opened while scanning the pressure to the spine region of a bound document is minimized. The angle θ is minimized to the extent that the wedge shaped platen 8 does not interfere with the projection path of scanning system 4, which is described in detail later.

In a preferred embodiment, angle θ is selected such that the outermost ray of light reflecting off of mirror 14 or side 10 of platen 8 is not eclipsed by side 12 of platen 8 from transmitting through lens 30. Assuming a one-to-one projection, the angle θ is constrained to be greater than or equal to the arctan[2f/(L/2−r)], where "2f" is indicated generally by reference number 48, "r" is indicated generally by reference numeral 49, and where "L" is indicated generally by reference number 46. Specifically, "f" is defined herein as the focal length of lens 30, "r" is defined herein as the radius of lens 30, and "L" defined herein as the width of the sensing area on each face 10 and 12 of wedge platen 8. Thus, the size of angle θ between face 10 and 12 of wedge shaped platen 8 is optimal when it minimizes the stress on the spine of a bound document while not interfering with the projection path of the imaging system.

Figure 4:
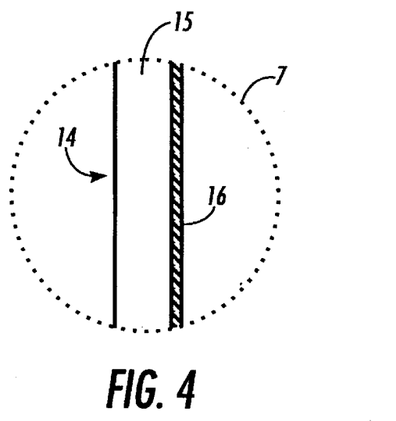
FIG. 4 is a detailed illustration of area 7 of the dichroic mirror shown in FIG. 1.

Dividing the wedge platen 8 is a dichroic mirror 14 that filters light by selective transmittance and reflectance of light of different wavelengths. The mirror 14 is centered between faces 10 and 12 of platen 8. With reference now to FIG. 4, area 7 of dichroic mirror 14 outlined in FIG. 1 is shown in detail in FIG. 4. Specifically, dichroic mirror 14 is formed by evaporating a thin anti-reflecting film 16, such as magnesium fluoride ($MgF_2$), onto one side of a substrate 15, such as glass. In the case of a band pass dichroic mirror, the transmittance and reflectance for a single wavelength of light is optimized by applying the film 16 on the substrate 15 with a thickness of an odd number of a quarter wavelengths thick (i.e. $\lambda/4$). Light incident on the film 16 and the substrate 15 having a wavelength of $\lambda$ is canceled out by destructive interference and therefore not "reflected" since each reflection is exactly 180° out of phase. Other light incident on the film 16 and the substrate 15 having a wavelength other than $\lambda$ is "reflected" without being canceled out by destructive interference.

Similar to the bandpass filter described above, mirror 14 can be formed with a broadband spectrum response that resembles a lowpass or a highpass filter. A broadband spectrum response is achieved by creating interference effects for a certain range of wavelengths using multiple layers of an anti-reflecting film formed on a substrate. Similar to a bandpass filter, a lowpass or a highpass dichroic mirror creates reflections at the surface of multiple layers of the anti-reflecting film and the surface of the substrate 15 that cancel out most reflections for a certain range of wavelengths. For example, a lowpass dichroic mirror fabricated by Melles Griot® transmits at least 90% of light having a wavelength shorter than 560 nm while transmitting no more than 10% of light having a wavelength greater than 600 nm (see Melles Griot 1995/96 Product Catalog page 5-4).

Figure 5:
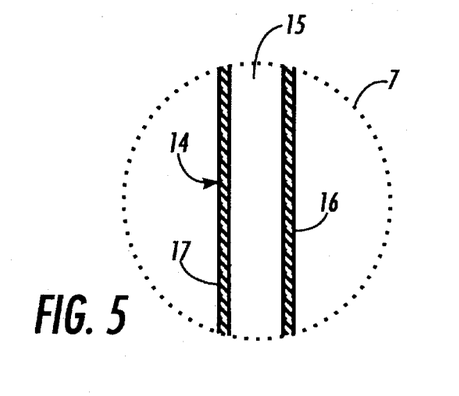
FIG. 5 is an alternate embodiment of the dichroic mirror shown in FIG. 4.

In an alternate embodiment, area 7 shown in FIG. 1 is shown in detail in FIG. 5. Unlike the portion of dichroic mirror 14 shown in FIG. 4, dichroic mirror 14 shown in FIG. 5 includes a second film 17. In FIG. 5, identical films 16 and 17 are applied to both sides of the substrate 15 in order to minimize light transmitted by mirror 14 that should be reflected when originally incident on film 16. The second film 17 minimizes the amount of light that is transmitted but should be reflected from again being transmitted through the mirror 14. Light that should otherwise be reflected by mirror 14 may potentially interfere with imager 32 which is described in detail later. Consequently, by applying the second film 17 to substrate 15, the contrast ratio between light reflecting off of and light transmitting through the mirror 14 is increased. For example, assuming that film 16 transmits 10% of light that should be otherwise reflected, film 17 is applied to substrate 15 to insure that at least 90% of the 10% that should have been reflected is not transmitted back through mirror 14 after reflecting off of face 10 of platen 8.

Pages of sides 20 and 22 of bound document 6 resting face down on platen 8 are illuminated by flash lamps 23 and 25 and reflectors 24 and 26, respectively. The mirror 14 is selected to have a spectrum response such that it reflects light emitted by lamp 25 and transmits light emitted by lamp 23. For example, if dichroic mirror 14 has response characteristics of a lowpass filter where shorter wavelengths pass through the mirror and longer wavelengths reflect off of the mirror (e.g. transmitting light having a wavelength less than 560 nm and reflecting light having a wavelength greater than 600 nm), lamp 23 would illuminate side 20 of bound document 6 with blue light which has a wavelength between 455 and 492 nm and lamp 25 illuminates side 22 of bound document 6 with red light which has a wavelength between 622 and 760 nm.

Figure 6:
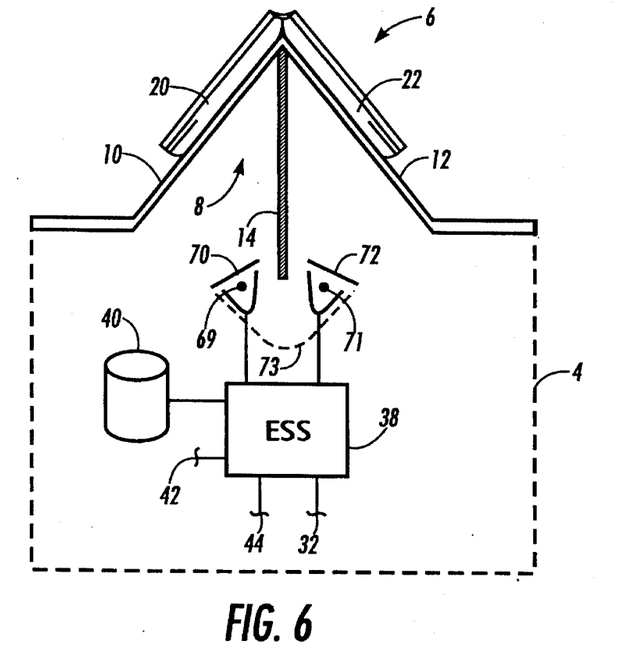
FIGS. 6 and 7 are alternate embodiments of the light source shown in FIGS. 1 and 2.
Figure 7:
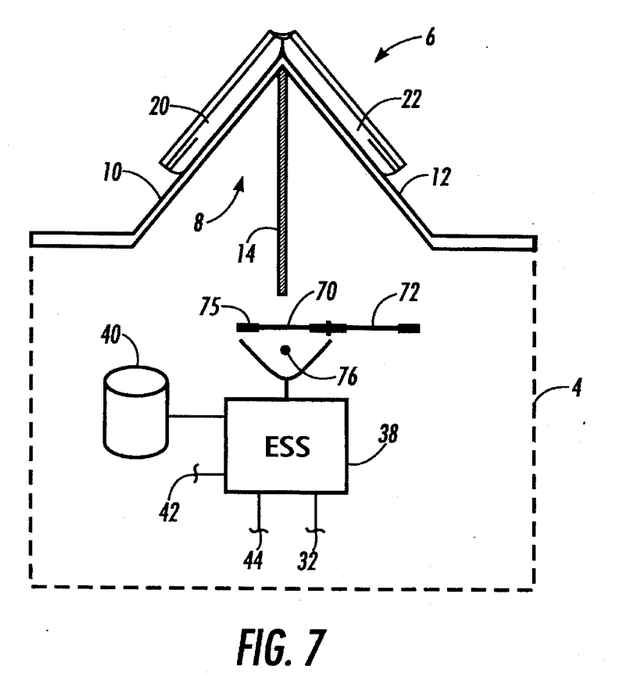

It will be readily understood by those skilled in the art that any number of lighting arrangements can be used to carry out the present invention. In the preferred embodiment, lamps 23 and 25 are arranged in separate housings. In an alternate embodiment, lamps 23 and 25 form part of a light source, shown generally by reference numeral 9. In another embodiment shown in FIG. 6, matching filters 70 and 72 are positioned in front of white light lamps 69 and 71, respectively. Each lamp 69 and 71, which form part of light source 73, emits a full spectrum of light unlike lamps 23 and 25 which emit a limited spectrum of light. Using matching filters 70 and 72, respectively, each lamp 69 and 71 emits a predefined wavelength of light similar to lamps 23 and 25. Specifically, the matching filter 72 in front of lamp 71 is selected so that light is emitted therefrom with a wavelength that is reflected by the dichroic mirror 14, while the matching filter 70 in front of lamp 69 is selected so that light is emitted therefrom with a wavelength that is transmitted through the dichroic mirror 14. In yet another embodiment shown in FIG. 7, a filter wheel 75 with matching filters 70 and 72 arranged thereon is mounted on white light source 76. The light source 76 emits a predetermined wavelength of light depending on whether the light source is covered by matching filter 70 or 72 on the filter wheel 75. Whether matching filter 70 or 72 is selected to cover light source 76 depends on the side of the wedge shaped platen being imaged. In addition, in the embodiment shown in FIG. 7, the arrangement of mirror 14 shown in FIG. 5 is required to insure that the light illuminating both sides of platen 8 is properly filtered before reaching imager 32.

By way of example, FIGS. 1 and 2 illustrate flash lamps 25 and 23 illuminating sides 22 and 20 of bound document 6, respectively. With reference initially to FIG. 1, flash lamp 25 illuminates the page of side 22 of bound document 6 with a short-lived flash of light that illuminates the page of side 22. Reflected illumination from the page of side 22 travels along a path depicted generally by ray 28, reflecting off of dichroic mirror 14 before passing through focal optics 30 and projecting onto two-dimensional sensor array or imager 32. Referring now to FIG. 2, flash lamp 23 illuminates the page of side 20 of bound document 6 with a flash of light. Reflected illumination from the page of side 20 travels along a path depicted generally by ray 34 and, unlike ray 28, is transmitted through mirror 14 and onto imager 32 as focused by optics 30. It will be appreciated by those skilled in the art that optics 30 are generally depicted in FIGS. 1 and 2. The optics 30 may be a traditional combination of lenses, apertures, mirrors and other optical elements designed to focus, reduce, enlarge, or fold images from sides 20 and 22 of wedge shaped platen 6 onto imager 32. It will be understood by those skilled in the art that magnification or reduction can be performed either by digital image processing techniques or by moving the combination of lenses forming optics 30.

Image data that is detected by the single page imager 32 has either been reflected by or transmitted through mirror 14. It will be appreciated by those skilled in the art that any sensor array or imager 32 that is adapted to record an image reflected from either side 10 or side 12 of wedge shaped platen 8 will suffice for the purposes of the present invention. The present invention operates using an active or a passive imaging system that detects a single page of a bound document sensed thereon. In the preferred embodiment, imager 32 is an array of active photosensor that converts optical image data represented by beams 28 or 34 into electrical image signals. Active photosensor arrays include imagers such as a flat panel detector, and a charge coupled device (CCD). As a flat panel detector, imager 32 comprises an array of thin film transistors and sensors that function as pixel element detectors. These thin film elements are generally constructed over a translucent substrate such as glass, forming a two dimensional detecting surface. An example of the thin film arrays are disclosed in U.S. Pat. No. 5,017,989 to Street et al., the pertinent portions of which are incorporated herein by reference. Alternatively, imager 32 can comprise a CCD photosensitive array that sequentially scans each side of the image plane using a movable optical carriage system. An example of a scanning carriage system using a CCD is disclosed in U.S. Pat. No. 5,276,530, the pertinent portions of which are incorporated herein by reference.

Once an image is projected from either side 20 or 22 of bound document 6 onto imager 32, electrical representations are read out of array 32 by suitable electronics in the form of digital image data and transmitted to an electronic subsystem (ESS) 38. At the ESS 38, the digital image data may either undergo further image processing or it may be stored on a storage device 40 which may include RAM, flash memory, floppy disk, or another form of optical or magnetic storage. Generally, ESS 38 includes a microprocessor and control software responsive to user or system demand for the processing and routing of image data. Image data stored on storage device 40 can be transmitted by ESS 38 through port 42 to other devices such as an electronic printer or facsimile for hard copy reproduction.

In an alternate embodiment, imager 32 comprises a passive photosensor such as a photoreceptor, or photographic film, or any other material that is sensitive to light. As a photoreceptor, imager 32 is regulated by ESS 38 which uses operating software stored in a memory (not shown) to control various stations (not shown) of imager 32. Generally, the photoreceptor is in the form of a movable belt or drum which is charged at a charging station to a relatively high, substantially uniform potential. Next, the charged photoconductive belt is advanced through imaging station 32 at which light rays reflected from one of the pages of the bound document 6 being copied on wedge shaped platen 8, as described above, create an electrostatic latent image on the photoconductive surface.

In the event imager 32 is a photoreceptor. ESS 38 must insure that the intensity of flash lamps 23 and 25 is sufficient to expose the surface of the photoreceptor, and that the speed at which the photoreceptor belt or drum is traveling is matched to the duration of the flash exposure. If the speed of the belt or drum is too great then excessive blurring of the latent image will occur. Subsequently, the electrostatic latent image is developed at a development station by a developer unit, such as a magnetic brush development unit, (not shown) and the developed image is transferred at a transfer station to a copy sheet supplied from a paper tray (not shown). Following transfer, the copy sheet bearing the transferred image is fed to a fusing station where a fuser (not shown) permanently affixes the toner powder image to the copy sheet. Such electrophotographic systems are well known in the art, an example of which is disclosed in U.S. Pat. No. 5,322,970, the pertinent portions of which are incorporated herein by reference.

In operation, ESS 38 is coupled to flash lamps 23 and 25, storage device 40, output port 42, scan switch mechanism 44 and imager 32. After detecting a start scan signal from switch 44, ESS 38 acts as a driver to each coupled component for synchronous flash exposure of side 20 and 22 of bound document 6 using lamps 23 and 25, respectively. Also, ESS 38 insures proper timing between exposures by lamps 23 and 25 so that previously sensed image data is fully recorded on storage device 40 before subsequent exposure of imager 32 to a new image.

Figure 8:
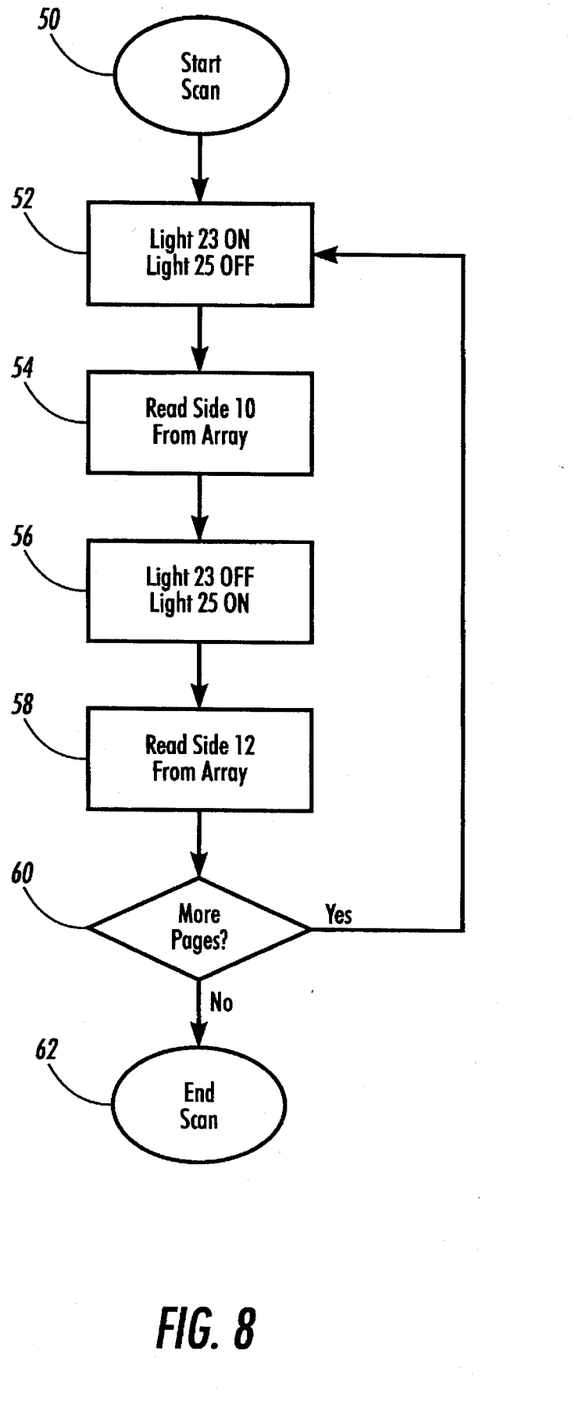
FIG. 8 is flow chart showing the general steps involving the operation of the scanning system shown in FIGS. 1 and 2.

FIG. 8 is a flow diagram illustrating control steps of scanning system 4 in operation. At step 50, ESS 38 senses that scan switch mechanism 44 has been invoked by an operator. Subsequently at step 52, ESS 38 turns ON flash lamp 23 to expose side 10 of platen 8 while keeping flash lamp 25 turned OFF. After exposure of side 10, ESS 38 reads a digital representation of side 20 of bound document 6 from imager 32, at step 54. This digital representation is either stored on storage device 40 or output through port 42 as described above. At step 56, once the imager 32 is cleared of image data representing side 20. ESS 38 turns ON flash lamp 25 to expose side 12 of platen 8 while keeping flash lamp 23 turned OFF. Once exposed, ESS 38 reads a digital representation of side 22 of bound document 6 from imager 32, at step 58. In a similar manner to step 54, side 22 is either stored on storage device 40 or output through port 42. At step 60, ESS 38 determines whether more pages are to be scanned by detecting a signal from switch mechanism 44. After step 60 and before repeating step 52 it is assumed that an operator will turn the page of bound document 6 before invoking the scan switch 44. If no scan signal is detected from switch mechanism 44, ESS 38 remains in a ready scan state at step 62.

Figure 9:
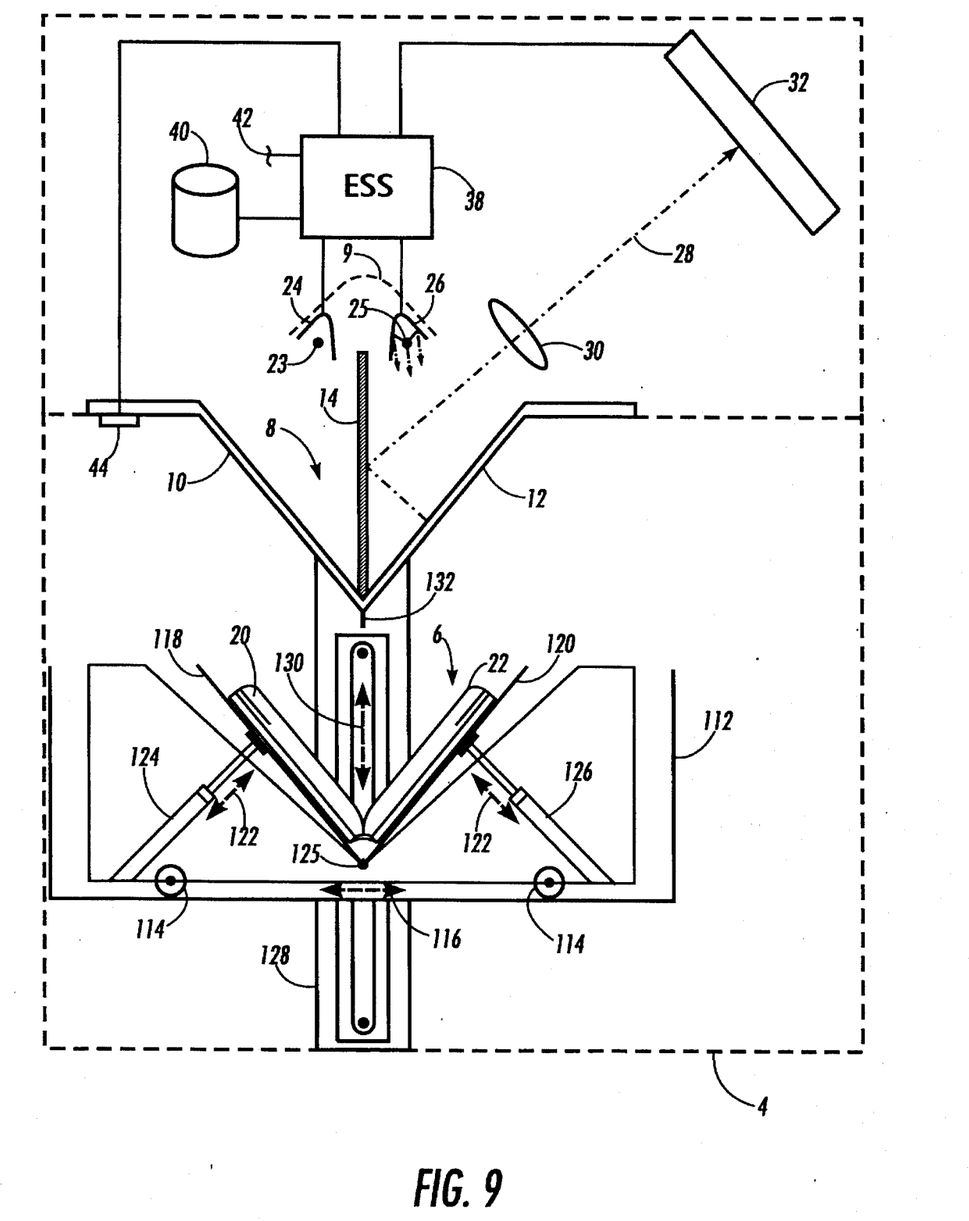
FIG. 9 is an alternate embodiment of the present invention in which a bound document is scanned in an open and upright position.

FIG. 9 is an alternate embodiment incorporating the invention in which scanning system 4 is inverted relative to scan bound document 6 in an open and upright position. In this embodiment, scanning system 4 includes a carriage 110 that is supported in a seating cavity 112. Rollers 114 move the carriage 110 laterally relative to the seating cavity 112 as indicated by arrow 116. The lateral movement of carriage 110 insures that the center of bound document 6 between sides 20 and 22, which varies depending on which pages to which bound document 6 are open, is centered in the middle of wedge platen 8. A pair of pivotally mounted support plates 118 and 120 are each secured to the carriage 110 by pistons 124 and 126, respectively, for angular movement about edge 125 as indicated by arrows 122. A drive assembly 128 moves the seating cavity 112 in a direction indicated by arrow 130. A position sensor 132 located at the apex of wedge platen 8 is retractable therein upon contact with bound document 6. ESS 38 communicates with drive assembly 128 to move seating cavity 112 vertically relative to wedge platen 8, and with rollers 114 to move the carriage laterally relative to the seating cavity 112. In response to a start scan signal from start scan switch mechanism 44, ESS 38 controls movement of the drive assembly 128, and rollers 114 to position bound document 6 in contact with wedge platen 8 for scanning. In addition, ESS actuates pistons 124 and 126 to ensure that pages of bound document 6 are firmly in contact with each side of wedge platen 8. Once each side of bound document 6 has been recorded by imager 32, ESS 38 actuates drive assembly 128 to lower seating cavity 112 away from wedge platen 8.

It should be understood by those skilled in the art that position sensor 132 can alternatively be a magnetic or capacitive proximity sensor, or an optical detector. It will further be appreciated that scanning system 4 can be modified to incorporate functions a system that automatically turns pages of a bound document. Examples of systems that turn pages of bound documents are disclosed by Turner et al. in U.S. patents applications Ser. No. 08/570,880 entitled "Bound Document Imager with Page Turner" to Turner et al., filed on Dec. 12, 1995 and assigned to the same assignee as the present invention, and U.S. patent application Ser. No. 08/570,791, which are incorporated herein by reference.

It will no doubt be appreciated that there are a number of possible manners in which to implement the scanning system 4. In summary, the present invention includes a wedge shaped platen having positioned therebetween a dichroic mirror that selectively transmits or reflects light of different wavelengths. In addition, this invention includes a light source that selectively emits light of different wavelengths. Although, preferred embodiment disclosed above includes two lamps a first for emitting red light and a second for emitting blue light, it will be readily understood by those skilled in the art that a light source having two lamps that selectively emit different wavelengths of light can be used to carry out the invention. In addition, the invention includes a first lamp that emits light having a wavelength that is reflected by the dichroic mirror, and a second lamp that emits light having a wavelength that is transmitted through the dichroic mirror. This aspect of the present invention provides that opposing pages of a bound document can be sequentially recorded using a single page imager.

It will also be appreciated that scanning system 4 can be readily modified to include job level programing as described by Rourke et al. in U.S. Pat. No. 5,119,206. Job level programming can include programming that manages input scanning as well as output rendering. Programming options for scanning bound documents include input commands for specifying whether to scan one or both sides of a bound document. Programming options for rendering scanned images of a bound document include specifying whether opposing sides of a bound document are to be printed on a common print media sheet or on separate print media sheets. It also be understood by those skilled in the art that reductions and enlargements of a side of bound document 6 can be achieved by altering the position and makeup of optics 30 or by manipulating digital image data stored on storage device 40.

Sequential control of scanning system 4 in ESS 38 may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized. The system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

I claim:

1. An apparatus for scanning a bound document having a first opposing page and a second opposing page, comprising:

a wedge shaped platen having a first transparent surface and a second transparent surface for supporting the bound document in an open condition with the first and the second opposing pages being adjacent the first and the second transparent surfaces;

a light source for illuminating the first transparent surface of said wedge shaped platen with light having a first wavelength, and the second transparent surface of said wedge shaped platen with light having a second wavelength;

an imager for sequentially capturing light reflected thereon from the first and the second transparent surfaces of said wedge shaped platen; and an optical element positioned in a first optical path extending between the first transparent surface and said imager, and positioned in a second optical path extending between the second transparent surface and said imager, said optical element transmitting light in the first optical path having the first wavelength and reflecting light in the second optical path having the second wavelength.

2. An apparatus according to claim 1, wherein said optical element is a dichroic mirror with a first side opposing the first transparent surface and a second side opposing the second transparent surface.

3. An apparatus according to claim 2, wherein said dichroic mirror transmits light having a wavelength greater than a threshold value and reflects light having a wavelength less than the threshold value.

4. An apparatus according to claim 2, wherein said dichroic mirror transmits light having a wavelength less than a threshold value and reflects light having a wavelength greater than the threshold value.

5. An apparatus according to claim 4, wherein the first wavelength of light is approximately equal to the wavelength of blue light.

6. An apparatus according to claim 4, wherein the second wavelength of light is approximately equal to the wavelength of red light.

7. An apparatus according to claim 2, wherein said dichroic mirror comprises a substrate, and a film applied to the second side of said substrate.

8. An apparatus according to claim 7, wherein said film is applied to the first side of said substrate, whereby a ratio of light transmitted and of light reflected by said dichroic mirror is increased.

9. An apparatus according to claim 1, further comprising a controller for sequentially controlling said light source to illuminate the first transparent surface of said wedge shaped platen with light having the first wavelength and to illuminate the second transparent surface of said wedge shaped platen with light having the second wavelength.

10. An apparatus according to claim 1, wherein said light source comprises:

a first lamp that emits light having the first wavelength; and a second lamp that emits light having the second wavelength.

11. An apparatus according to claim 1, further comprising:

a first matching filter mounted in front of said light source to filter light having the first wavelength; and a second matching filter mounted in front of said light source to filter light having the second wavelength.

12. An apparatus according to claim 11, wherein said first and second matching filters are mounted on a filter wheel.

13. An apparatus according to claim 11, wherein said light source comprises:

a first lamp having said first matching filter mounted thereon; and a second lamp having said second matching filter mounted thereon.

14. An apparatus according to claim 1, further comprising a storage medium communicating with said controller for storing an image representing the first opposing page and an image representing the second opposing page of the bound document.

15. An apparatus according to claim 1, wherein said imager comprises a photoreceptor.

16. An apparatus according to claim 1, wherein said imager comprises a two-dimensional flat panel detector array of amorphous silicon sensors.

17. An apparatus according to claim 1, wherein the first transparent surface and the second transparent surface of said wedge shaped platen meet at an angle of less than ninety degrees.

18. An apparatus according to claim 1, further comprising a lens for focusing an image of the first opposing page and an image of the second opposing page of said bound document onto said imager.

19. A method for scanning a bound document supported on a wedge shaped platen having a first transparent surface and a second transparent surface, comprising the steps of:

(a) positioning an imager to receive images projected from the first and the second transparent surfaces;

(b) positioning an optical element in a first optical path extending between the first transparent surface and the imager, and in a second optical path extending between the second transparent surface and the imager;

(c) illuminating a first opposing page of the bound document positioned on the first transparent surface of the wedge shaped platen with light having a first wavelength;

(d) capturing with the imager a representation of the first opposing page illuminated along the first optical path;

(e) illuminating a second opposing page of the bound document positioned on the second transparent surface of the wedge shaped platen with light having a second wavelength; and (f) capturing with the imager a representation of the second opposing page illuminated along the second optical path.

20. The method according to claim 19, further comprising the step of detecting a start scan signal from a switch.

21. The method according to claim 20, further comprising the step of repeating steps (c) through (f) in response to said detecting step.

22. The method according to claim 19, further comprising the step of turning a page of the bound document after completing steps (c) through (f).

23. The method according to claim 22, further comprising the steps of repeating steps (c) through (f) after completing said turning step.

24. The method according to claim 19, wherein said step of positioning the optical element comprises the steps of:

transmitting, through the optical element, along the first optical path light having the first wavelength; and reflecting, from the optical element, along the second optical path light having the second wavelength.

25. A method according to claim 19, wherein said illuminating steps (c) and (e) include the steps of selecting a first matching filter for providing light having the first wavelength, and selecting a second matching filter for providing light having the second wavelength.

* * * * *